US009299094B2

(12) United States Patent
Pazdziora et al.

(10) Patent No.: US 9,299,094 B2
(45) Date of Patent: *Mar. 29, 2016

(54) STATE-BASED COMPLIANCE VERIFICATION IN A DISCONNECTED SYSTEM

(75) Inventors: Jan Pazdziora, Brno (CZ); Tomáš Mráz, Tábor (CZ)

(73) Assignee: Red Hat Inc., Raleigh, NC (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/784,274

(22) Filed: May 20, 2010

(65) Prior Publication Data

US 2011/0288973 A1 Nov. 24, 2011

(51) Int. Cl.
G06F 21/10 (2013.01)
G06Q 30/04 (2012.01)
H04L 9/32 (2006.01)

(52) U.S. Cl.
CPC .............. *G06Q 30/04* (2013.01); *G06F 21/105* (2013.01); *H04L 9/3236* (2013.01); *G06Q 2220/18* (2013.01)

(58) Field of Classification Search
None
See application file for complete search history.

(56) References Cited

U.S. PATENT DOCUMENTS

| 7,024,695 | B1 | 4/2006 | Kumar et al. | |
|---|---|---|---|---|
| 7,155,414 | B2 | 12/2006 | Barritz et al. | |
| 7,684,067 | B2 | 3/2010 | Smithson | |
| 7,904,450 | B2 | 3/2011 | Wilson | |
| 7,949,877 | B2 * | 5/2011 | Hug | 713/176 |
| 8,086,859 | B2 | 12/2011 | Pavlicic | |
| 8,375,450 | B1 | 2/2013 | Oliver et al. | |
| 8,719,386 | B2 | 5/2014 | Lyman et al. | |
| 2002/0019977 | A1 * | 2/2002 | Matsuzuki | 717/170 |
| 2002/0065780 | A1 | 5/2002 | Barritz et al. | |
| 2004/0054908 | A1 * | 3/2004 | Circenis et al. | 713/176 |
| 2005/0160095 | A1 * | 7/2005 | Dick et al. | 707/10 |
| 2007/0150857 | A1 * | 6/2007 | Korkishko et al. | 717/106 |
| 2007/0179985 | A1 * | 8/2007 | Knowles et al. | 707/200 |
| 2007/0208944 | A1 | 9/2007 | Pavlicic | |
| 2008/0086754 | A1 * | 4/2008 | Chen et al. | 725/105 |
| 2008/0123124 | A1 | 5/2008 | Smithson | |
| 2008/0141365 | A1 | 6/2008 | Soegtrop | |
| 2008/0148253 | A1 * | 6/2008 | Badwe et al. | 717/174 |
| 2008/0216147 | A1 * | 9/2008 | Duffy | 726/1 |
| 2009/0100041 | A1 | 4/2009 | Wilson | |
| 2010/0262834 | A1 * | 10/2010 | Freeman et al. | 713/184 |
| 2011/0289002 | A1 * | 11/2011 | Pazdziora et al. | 705/59 |

OTHER PUBLICATIONS

Red Hat Office Action (P771) for U.S. Appl. No. 12/784,255, mailed Jan. 5, 2012.
Red Hat Office Action (P771) for U.S. Appl. No. 12/784,255, mailed Apr. 26, 2012.
Office Action mailed Nov. 13, 2014 for U.S. Appl. No. 12/784,255.

* cited by examiner

*Primary Examiner* — Allen Chein
(74) *Attorney, Agent, or Firm* — Lowenstein Sandler LLP

(57) ABSTRACT

Some embodiments of a system and a method to verify compliance in a disconnected system have been presented. For instance, a provider server can collect system management server state hashes from a set of computer systems in transactions not directly related to billing between the provider server and the computer systems. The computer systems may be coupled to a system management server that is within an internal network of a customer. The provider server can verify compliance information submitted by the customer using the system management server state hashes collected without communicating with the system management server in the internal network.

15 Claims, 7 Drawing Sheets

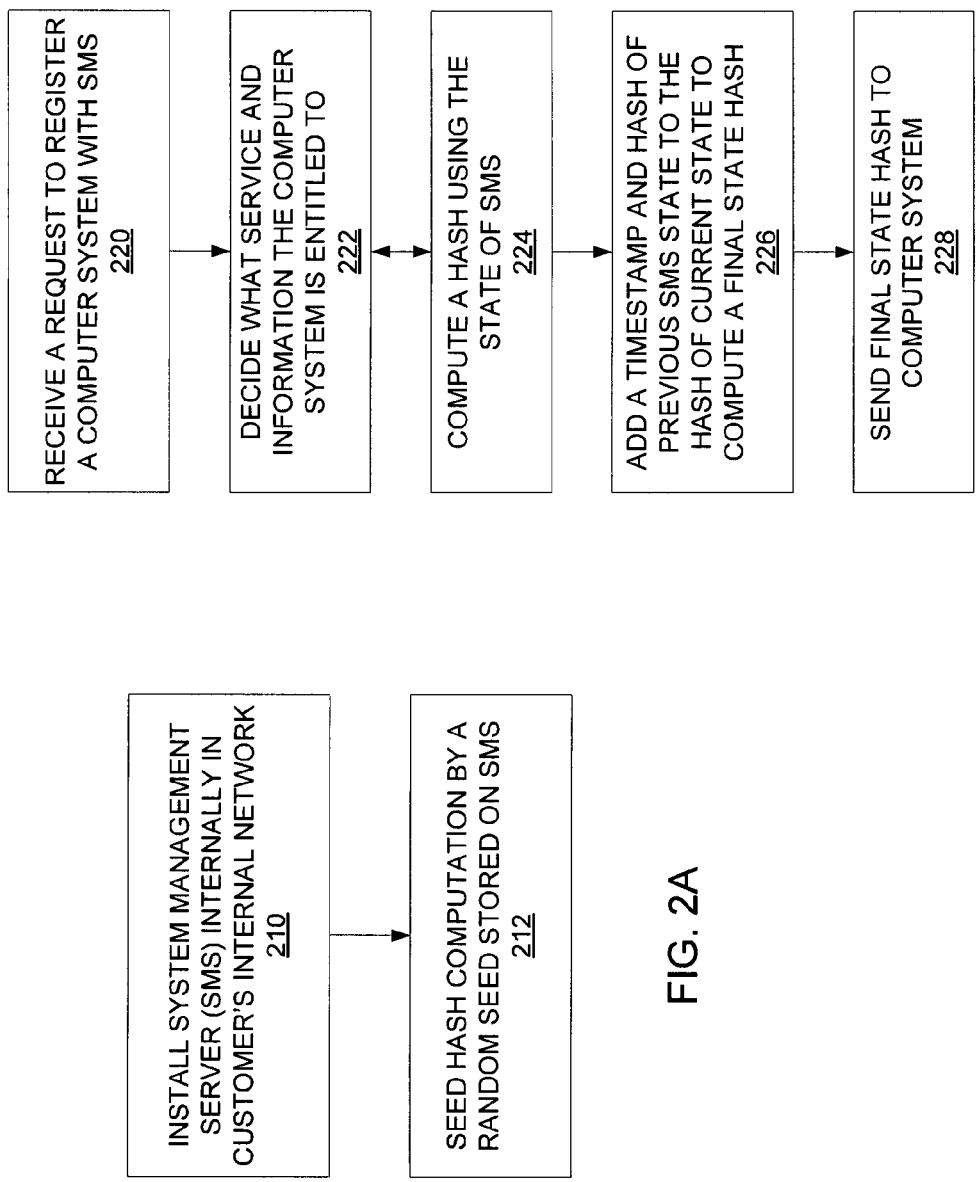

STATE-BASED COMPLIANCE VERIFICATION IN A DISCONNECTED SYSTEM

TECHNICAL FIELD

Embodiments of the present invention relate to software, and more specifically to compliance verification in sale or licensing of digital products, such as software, music, electronic books, etc.

BACKGROUND

Currently, a system management server can be installed in a customer's facilities in a disconnected mode. In that mode, the server does not "call home" to the system management server provider's network or to any other proprietary service, and it is able to operate completely independently. That includes management of entitlements, allowing client machines to consume software channels and other services.

A conventional signed "certificate" is issued to the customer, which has the number of entitlements listed for each item. The numbers are then copied to the database tables and the system management server restricts access if the limit is reached. Nothing, however, prevents customers from tampering the database tables, such as increasing the raw numbers in the database tables to bump up their entitlements. Since the system management server is installed in the customer's internal network, no direct verification of the system management server state and correctness of the information reported is possible.

BRIEF DESCRIPTION OF THE DRAWINGS

The present invention is illustrated by way of example, and not by way of limitation, in the figures of the accompanying drawings and in which:

FIG. 2A illustrates a flow diagram of one embodiment of a method to prepare for compliance verification.

FIG. 2B illustrates a flow diagram of one embodiment of a method to register a computer system with a system management server.

DETAILED DESCRIPTION

Figure 1:
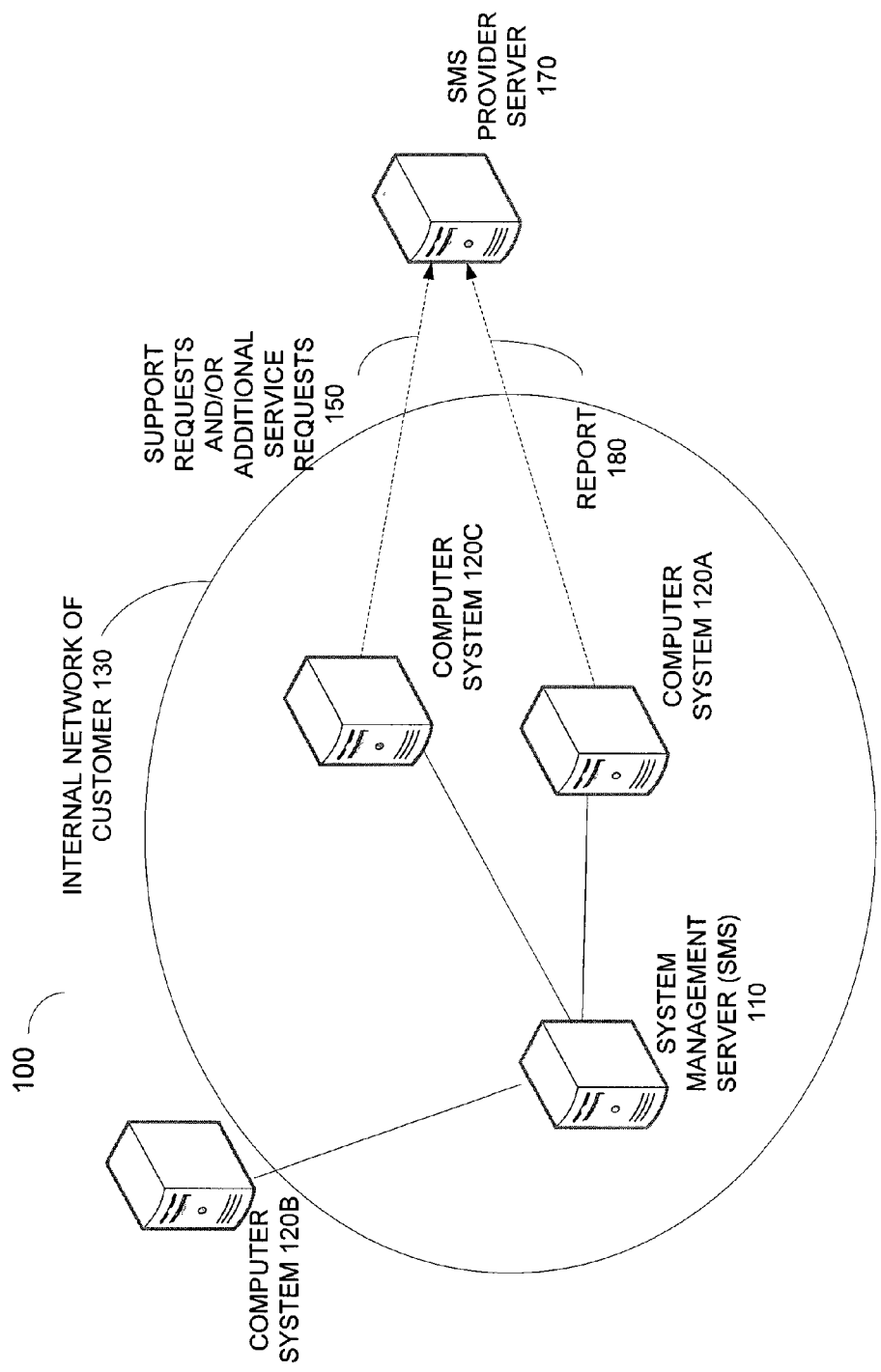
FIG. 1 illustrates one embodiment of a system usable in some embodiments of the invention.

Described herein are some embodiments of a method, an apparatus, and a system to verify compliance of a disconnected system. The disconnected system typically includes a system management server within an internal network of a customer, and a set of computer systems. The system management server is provided by a software vendor (also referred to as the system management server provider), whereas the internal network and the computer systems belong to the customer. The system management server manages the computer systems, such as determining what software and/or services the computer systems are entitled to.

In some embodiments, a server of the system management server provider, external to the customer's network, can collect system management server state hashes from the computer systems in transactions not directly related to billing between the provider server and the computer systems. The provider server can verify compliance information submitted by the customer using the system management server state hashes collected without communicating with the system management server in the internal network. More details of some embodiments of state-based compliance verification in a disconnected system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting" or "verifying" or "deriving" or "identifying" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
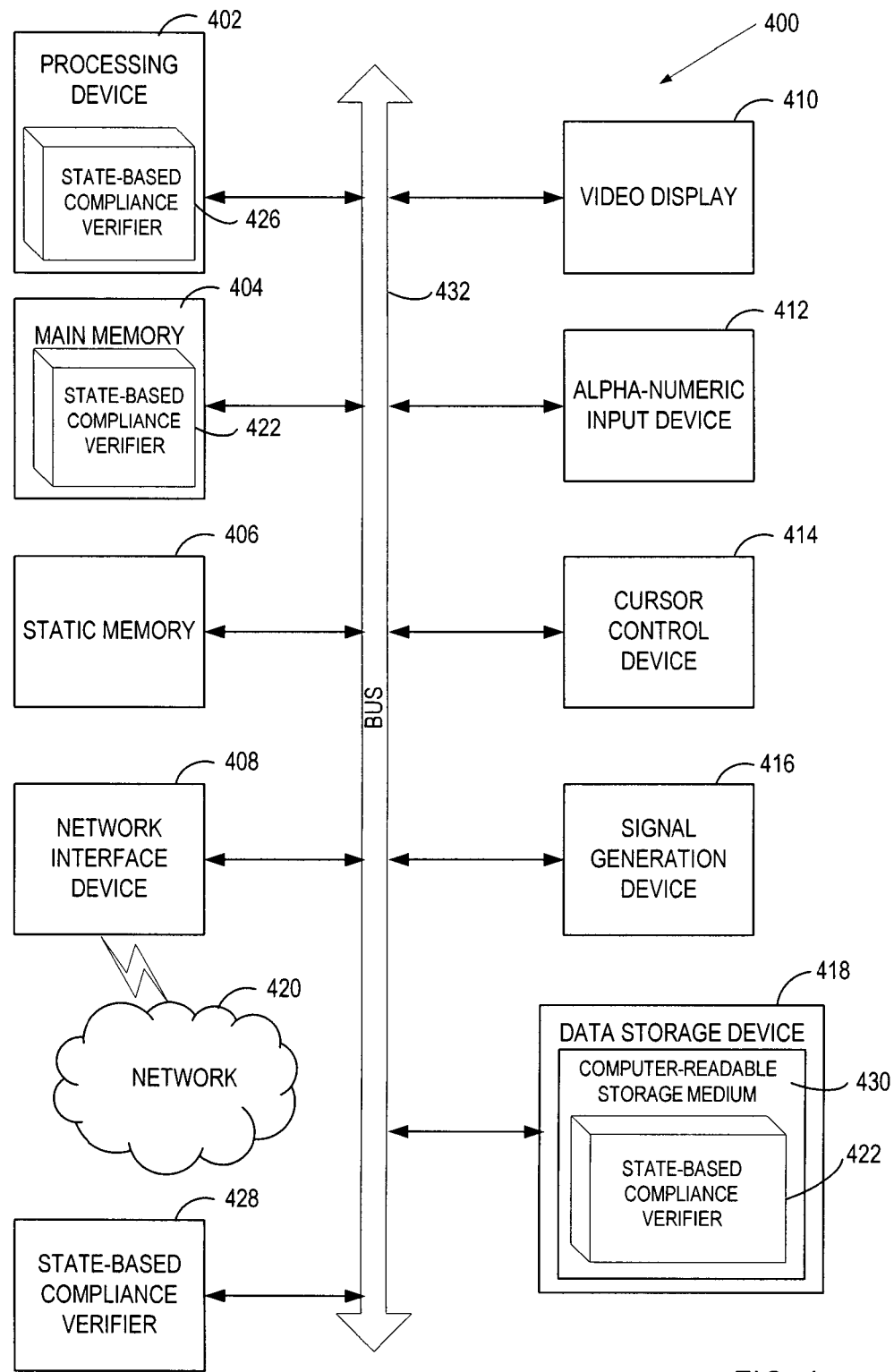
FIG. 4 illustrates a block diagram of an exemplary computing system.

FIG. 1 illustrates one embodiment of a system usable in some embodiments of the invention. The system 100 includes a system management server (SMS) 110 and a number of computer systems 120A-120C, and a SMS provider server 170. The SMS 110, computer systems 120A-120C, and SMS provider server 170 may be implemented on one or more computing machines, such as a server, a desktop personal computer, a laptop computer, a personal digital assistant, etc. Details of one example of a computing machine are illustrated in FIG. 4. The internal network 130 typically includes a private network (e.g., a local area network), access of which is restricted or protected. The computer systems 120A-120C are coupled to each other within and/or outside of an internal network 130 of a customer. For example, computer system 120B may be a roaming laptop computer, which is connected to the Internet, or accesses the internal network 130 from the Internet via some sort of proxy. In general, the SMS 110 and the computer systems 120A-120C are disconnected from the SMS provider server 170. Thus, the system 100 may also be referred to as a disconnected system. However, the computer systems 120A-120C may occasionally connect to the SMS provider server 170 over an external network (e.g., the Internet) to request service from the SMS provider server 170, to receive updates from the SMS provider server 170, to send compliance information to the SMS provider server 170, etc.

In some embodiments, the SMS 110 is used to manage computer systems 120A-120C within the customer's internal network 130. The computer systems 120A-120C are registered to the SMS 110, and the SMS 110 decides what services (such as management, provisioning, monitoring, etc.) and what information feeds (e.g., software and configuration channels, repositories, etc.) the computer systems 120A-120C are entitled to use and consume per an agreement (e.g., a license) previously established between the customer and the SMS provider. Because the SMS 110 is installed internally within the customer's internal network 130 and managed by the customer, the customer can potentially tamper with an entitlement database within the SMS 110, which stores the type and number of entitlements the customer is allowed. For example, the customer may increase the number of entitlements, which was granted and billed to the customer in the entitlement database of the SMS 110. To allow detection of such situation, and to increase the chance that tampering may be detected, dissemination of information about the SMS's state can be used as discussed below.

In general, any time a new computer system is registered to the SMS 110, or is added to new service, the state of the SMS 110 changes. The SMS 110 may take its state, including a list of computer systems registered at that moment (e.g., computer systems 120A-120C), the registered computer systems' entitlements, optionally including software and configuration channels, as well as a list of packages installed on the registered computer systems (as reported by the registered computer systems), format the above information, and then compute a hash of the formatted information using a cryptographically strong algorithm, such as SHA-2. The SMS 110 may further add a timestamp and a hash of the previous state of the SMS 110 to the hash in order to compute a final SMS state hash. In some embodiments, the hash computation is seeded by a random seed generated and stored on the SMS 110 when the SMS 110 is installed in the customer's internal network 130. Note that each SMS state hash describes and identifies a previous SMS state. The SMS state hash may represent all the information which might be important for compliance verification and billing purposes, together with full entitlement usage history, as each SMS state hash includes information of previous SMS state, which in turns leads to information which has hash to its predecessor, etc.

In some embodiments, the SMS 110 sends the SMS state hash to the computer system (e.g., computer system 120A) being registered to the SMS 110 as part of its credential, which the computer system has to present during any subsequent interaction with the SMS 110. Optionally, upon each communication of the computer system with the SMS 110, new state information can be generated on the SMS 110, including the timestamp of the communication and new credentials can be handed to the computer system to be used in the future. This way, the hash of full server entitlement state with full history may be stored at any new computer system being registered and being managed. However, the SMS state hash cannot be used by the computer systems 120A-120C to gain any information about the SMS 110 because the SMS state hash is encrypted and keyed with a secret seed concealed from the computer systems 120A-120C.

The SMS provider server 170 then makes it part of the process of handling support requests and/or additional service requests 150 from the computer systems 120A-120C to present the SMS state hash. The SMS state hash can also be used as a part of credentials to access other information services and sources of the SMS provider, such as knowledge base web systems. Thus, the SMS provider can gather SMS state hashes of the SMS 110 from the computer systems 120A-120C to later verify the status and history of the SMS 110.

At the end of a billing period, the customer submits a report 180 enumerating the usage of individual entitlements during the billing period. The customer may use the SMS 110 to generate the report 180. As part of the report 180, the last state of the SMS 110 is presented, including its hash, and a list of state hashes since the start of the operation of the SMS 110, or since the end of last billing period.

The SMS provider server 170 can then verify that the SMS state hashes gathered from the computer systems 120A-120C throughout the support events or while accessing information sources during this billing period match the SMS state hashes provided by the customer with the billing information in the report 180. In some embodiments, the SMS provider server 170 may also randomly request full SMS state information matching one of the SMS state hashes to verify that, indeed, the computer system, which has generated the support event or accessed the information source was present in the report 180.

The above compliance verification approach makes it more difficult for the customer to cheat on entitlement usage, even though the SMS provider server 170 cannot continuously monitor the customer's entitlement usage because the customer's internal network 130 and the SMS 110 are not always connected to the SMS provider server 170.

FIG. 2A illustrates a flow diagram of one embodiment of a method to prepare for compliance verification. The method may be performed by processing logic that may comprise hardware (e.g., circuitry, dedicated logic, programmable logic, microcode, etc.), software (such as instructions run on a processing device), firmware, or a combination thereof. For instance, the SMS provider server 170 illustrated in FIG. 1, which can be implemented using the computing system 400 illustrated in FIG. 4, may perform at least part of the method in some embodiments.

Initially, processing logic installs a system management server (SMS) internally in a customer's internal network (processing block 210). The SMS manages computer systems in the customer's internal network as discussed above. Details of one embodiment of a SMS are further discussed below with reference to FIG. 3. Processing logic further seeds hash computation by a random seed stored on the SMS (processing block 212).

FIG. 2B illustrates a flow diagram of one embodiment of a method to register a computer system with a SMS. The method may be performed by processing logic that may comprise hardware (e.g., circuitry, dedicated logic, programmable logic, microcode, etc.), software (such as instructions run on a processing device), firmware, or a combination thereof. For instance, the SMS 110 illustrated in FIG. 1 may perform at least part of the method in some embodiments.

Initially, processing logic receives a request to register a computer system with the SMS (processing block 220). Then processing logic decides what service and information the computer system is entitled to (processing block 222). For example, processing logic may check an entitlement database in the SMS to determine the service and information the computer system is entitled to. Then processing logic computes a hash using the current state of the SMS (processing block 224).

In some embodiments, processing logic further adds a timestamp and a hash of the previous SMS state to the above hash of the current SMS state in order to compute a final state hash (processing block 226). Then processing logic sends the final state hash to the computer system (processing block 228).

In general, the state of the SMS changes whenever a computer system is registered with the SMS. Therefore, next time another computer system is registered, the state of the SMS changes. A new hash can be computed in a similar fashion and sent to this computer system. As such, hashes of information about all or part of the history of the state of the SMS can be saved on the registered computer systems.

Figure 2C:
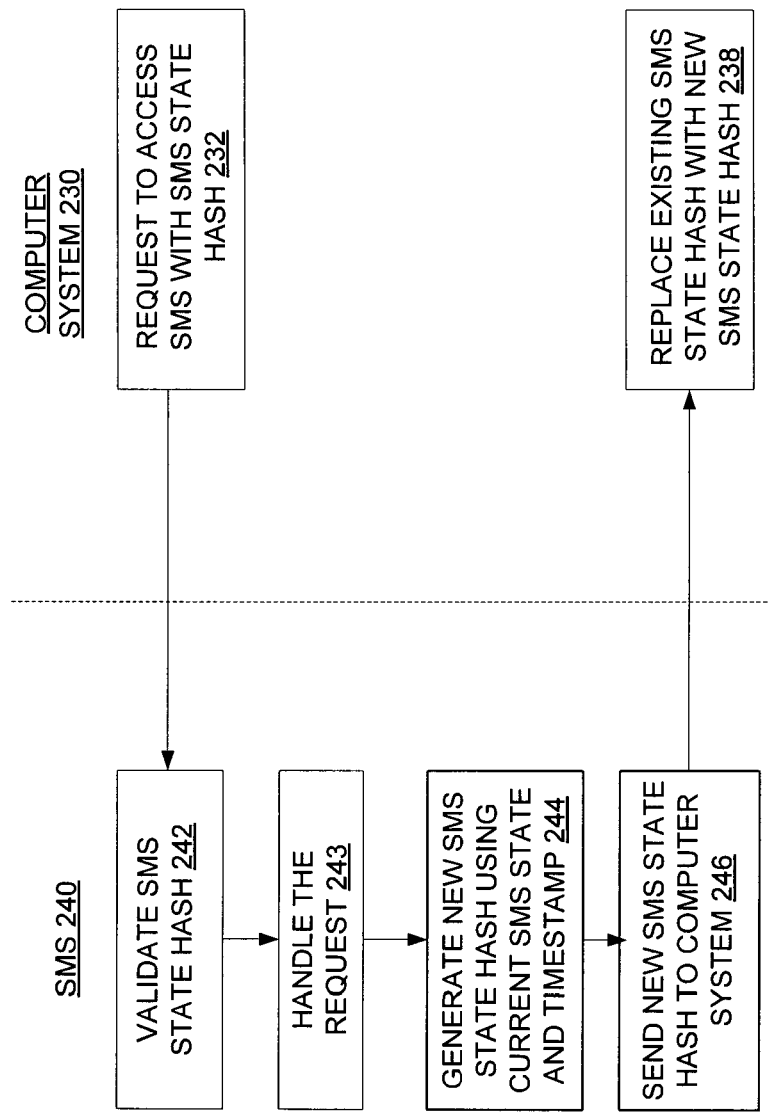
FIG. 2C illustrates a flow diagram of one embodiment of a method to generate a system management server state hash for a registered computer system.

FIG. 2C illustrates a flow diagram of one embodiment of a method to generate a system management server state hash for a registered computer system. The method may be performed by a SMS 240 (such as the SMS 110 illustrated in FIG. 1) and a computer system 230 (such as the computer system 120A illustrated in FIG. 1). In the following example, the computer system 230 has already registered with the SMS 240 using the approach discussed above.

In some embodiments, the computer system 230 sends a request (e.g., a provisioning request) to access the SMS 240 (processing block 232). The request includes a SMS state hash currently stored in the computer system 230. The computer system 230 may have obtained the SMS state hash the last time the computer system 230 accessed the SMS 240, such as registering with the SMS 240. The request may further include credentials of the computer system 230, such as user name, machine identifier, password, etc.

When the SMS 240 receives the request and the SMS state hash, the SMS 240 validates the request and the SMS state hash (processing block 242). After successfully validating the request and the SMS state hash, the SMS 240 handles the request (processing block 243) and generates a new SMS state hash using the current SMS state and timestamp (processing block 244). Then the SMS 240 sends the new SMS state hash to the computer system as part of the response (processing block 246).

When the computer system 230 receives the new SMS state hash from the SMS 240, the computer system 230 replaces the existing SMS state hash with the new SMS state hash (processing block 238). The computer system 230 may send the new SMS state hash to the SMS 240 next time the computer system 230 attempts to access the SMS 240.

Figure 2D:
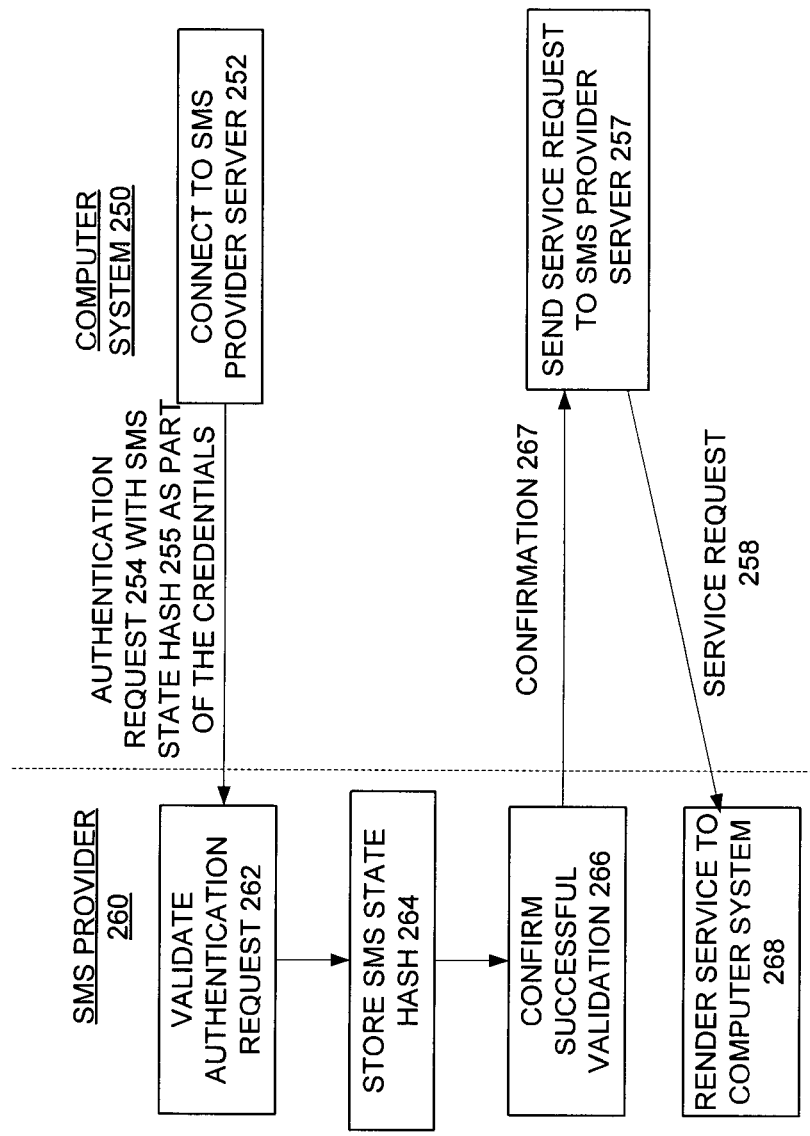
FIG. 2D illustrates a flow diagram of one embodiment of a method to gather system management server state hashes from a registered computer system.

FIG. 2D illustrates a flow diagram of one embodiment of a method to gather system management server state hashes from a registered computer system. The method may be performed by a SMS provider server 260 (such as the SMS provider server 170 illustrated in FIG. 1) and a computer system 250 (such as the computer system 120A illustrated in FIG. 1). In the following example, the computer system 250 has already registered with a SMS (such as SMS 240 in FIG. 2C) using the approach discussed above.

In some embodiments, the computer system 250 connects to the SMS provider server 260 over a network, such as the Internet (processing block 252). To connect to the SMS 260, the computer system 250 sends an authentication request 254 with a SMS state hash 255 as part of the credentials to the SMS provider server 260. The computer system 250 may have received the SMS state hash 255 when it registered with a SMS, or when it last accessed the SMS.

When the SMS provider server 260 receives the authentication request 254 and the SMS state hash 255, the SMS provider server 260 validates the authentication request 254 (processing block 262). The SMS provider server 260 further stores the SMS state hash 255 (processing block 264). Then the SMS provider server 260 confirms successful validation of the computer system 250 by sending a confirmation 267 to the computer system 250 (processing block 266). The computer system then sends a service request 258 to the SMS provider server 260 (processing block 257). In response to the service request 258, the SMS provider server 260 renders service to the computer system (processing block 268).

Figure 2E:
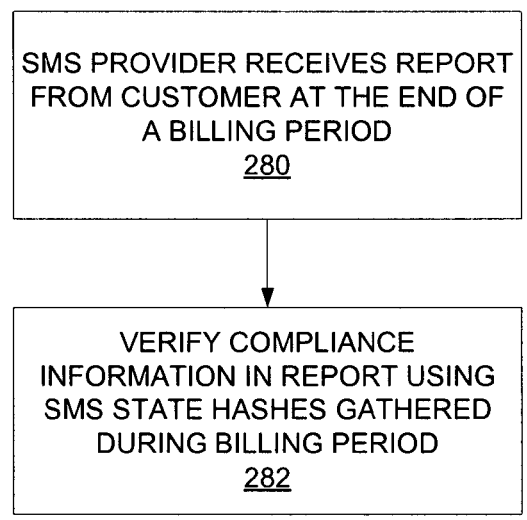
FIG. 2E illustrates a flow diagram of one embodiment of a method to verify compliance information from customers.

FIG. 2E illustrates a flow diagram of one embodiment of a method to verify compliance information from customers. The method may be performed by processing logic that may comprise hardware (e.g., circuitry, dedicated logic, programmable logic, microcode, etc.), software (such as instructions run on a processing device), firmware, or a combination thereof. For instance, the SMS provider server 170 illustrated in FIG. 1 may perform at least part of the method in some embodiments.

Initially, processing logic receives a report containing compliance information from a customer at the end of a billing period (processing block 280). Using SMS state hashes gathered during the billing period, processing logic verifies the compliance information in the report (processing block 282). If there is any discrepancies between the compliance information in the report and the SMS state hashes gathered, processing logic may alert the SMS provider and/or request the customer to submit additional information for further investigation.

Figure 3:
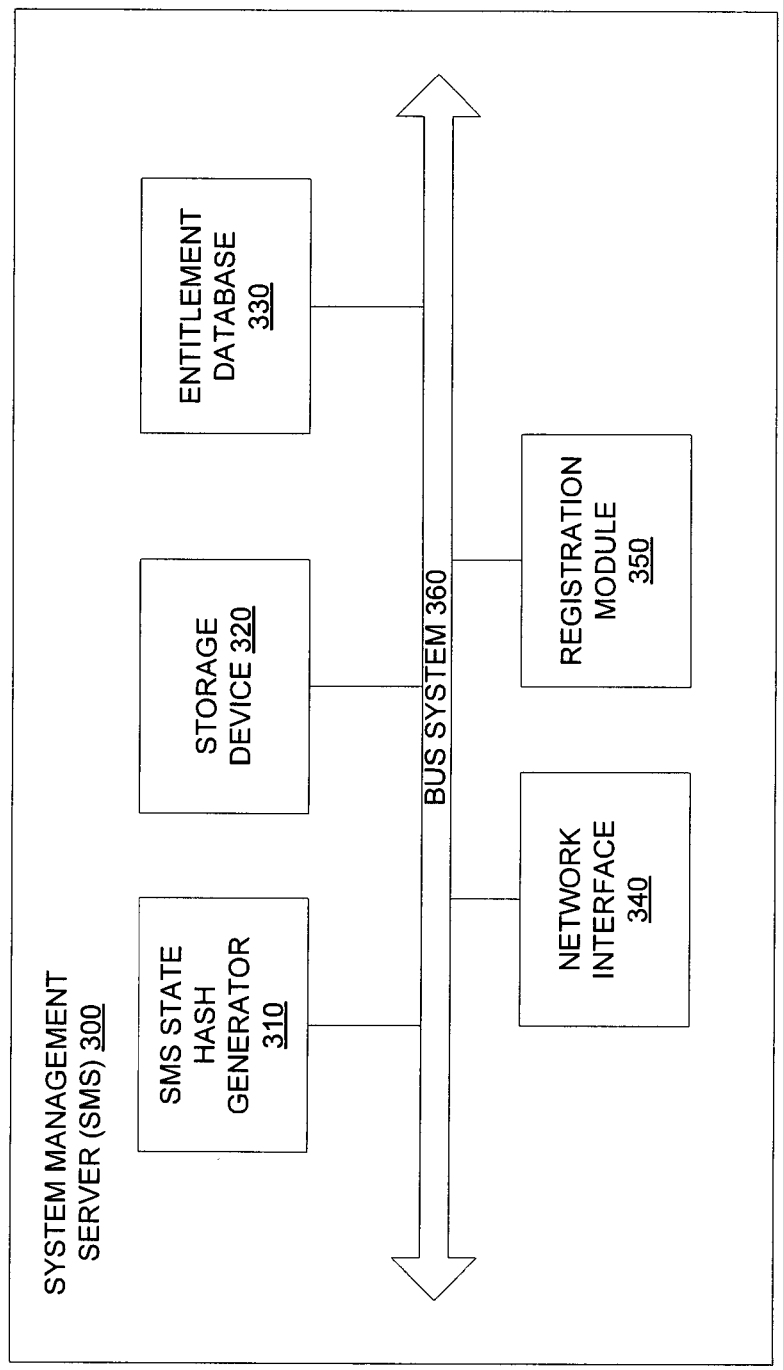
FIG. 3 illustrates one embodiment of a system management server.

FIG. 3 illustrates a block diagram of one embodiment of a system management server (SMS). The SMS 300 may be implemented with a computing machine, such as the one illustrated in FIG. 4. In general, a software vendor, also referred to as the SMS provider, provides the SMS to a customer to manage the customer's computer systems. Referring to FIG. 3, the SMS 300 includes a SMS state hash generator 310, a storage device 320, an entitlement database 330, a network interface 340, and a registration module 350, coupled to each other via a bus system 360.

In some embodiments, the network interface 340 communicably coupled to an internal network of a customer in which the SMS 300 has been installed. The internal network may further include one or more computer systems, such as computer systems 120A-120C shown in FIG. 1. The network interface 340 may also be used to access an external network, such as the Internet, in order to communicate with the SMS provider.

When a computer system in the customer's internal network initializes, the computer system may register with the SMS 300. The registration module 350 decides what service and information the computer system is entitled to by checking the entitlement database 330. For example, the entitlement database 330 may store the number of copies of a proprietary operating system the customer has licensed.

In some embodiments, the SMS state hash generator 310 uses a current state of the SMS 300, a timestamp, and a hash of a prior SMS state hash to generate a new SMS state hash. The SMS state hash generator 310 may employ a cryptographically strong hash algorithm, such as SHA-2, to generate the SMS state hash. Because there is no previous SMS state hash the first time the SMS state hash generator 310 computes the SMS state hash, the SMS state hash generator 310 may use a randomly generated seed stored in the storage device 320 instead. Note that the randomly generated seed is not provided to the customer's computer systems for security reason. Finally, the SMS 300 sends the newly computed SMS state hash to the computer system. The SMS 300 may also store a copy of the newly computed SMS state hash in the storage device 320, which will be used by the SMS state hash generator 310 to compute a new hash next time.

In some embodiments, the SMS state hash generator 310 generates a new SMS state hash every time the computer system accesses the SMS 300, and the SMS sends the new SMS state hash to the computer system via the network interface 340. The computer system may be required to send its current copy of the SMS state hash to the SMS provider when requesting services from the SMS provider. As such, the SMS provider can collect a set of SMS state hashes from the computer system during a billing period via transactions not directly related to billing (e.g., processing service request, granting access to knowledgebase, etc.). At the end of the billing period, the SMS provider can use these SMS state hashes to verify compliance information submitted by the customer.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the state-based compliance verifier 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., state-based compliance verifier 422) embodying any one or more of the methodologies or functions described herein. The state-based compliance verifier 422 may also reside, completely or at least partially, within the main memory 404 and/or within the processing device 402 during execution thereof by the computing system 400, the main memory 404 and the processing device 402 also constituting computer-accessible storage media. The state-based compliance verifier 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The state-based compliance verifier 428, components and other features described herein (for example, in relation to FIG. 1) can be implemented as discrete hardware components or integrated into the functionalities of hardware components, such as ASICS, FPGAs, DSPs, or similar devices. In addition, the state-based compliance verifier 428 can be implemented as firmware or functional circuitries within hardware devices. Further, the state-based compliance verifier 428 can be implemented in any combination of hardware devices and software components.

Thus, some embodiments of a system and a method to verify compliance in a disconnected system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a first computer system, from a second computer system of a computer network associated with a customer, a first hash value during a first transaction not directly related to billing of the customer, wherein the first computer system is external to the computer network associated with the customer, and wherein the first hash value is generated by a third computer system of the computer network associated with the customer and is transmitted to the second computer system in response to a registration request by the second computer system, and wherein the second computer system is registered in response to the registration request, and wherein the first hash value is generated by the third computer system in view of a first state of the third computer system;
receiving, by the processing device, from a fourth computer system of the computer network associated with the customer, a second hash value during a second transaction not directly related to billing of the customer, wherein the second hash value is generated by the third computer system and is transmitted to the fourth computer system in response to a registration request by the fourth computer system, and wherein the second hash value is generated in view of a second state of the third computer system and the first hash value, and wherein the third computer system transitions from the first state to the second state in view of the registration of the second computer system;
receiving, by the processing device, a report corresponding to a time period, wherein the report comprises the first hash value and usage information associated with usage of one or more services by the second computer system during the time period; and
verifying, by the processing device, the usage information in view of the first hash value without communicating with the third computer system.

2. The method of claim 1, further comprising:
verifying, by the processing device, a state history of the third computer system in view of the first hash value; and
comparing, by the processing device, the usage information with the state history.

3. The method of claim 1, further comprising:
receiving, by the processing device, an authentication request from the second computer system.

4. The method of claim 1, wherein the third computer system stores a randomly generated seed for computing the first hash value.

5. The method of claim 1, further comprising:
billing, by the processing device, the customer in view of the usage information.

6. A non-transitory computer-readable storage medium comprising instructions that, when executed by a processing device of a first computer system, cause the processing device to:
receive, by the processing device, from a second computer system of a computer network associated with a customer, a first hash value during a first transaction not directly related to billing of the customer, wherein the first computer system is external to the computer network associated with the customer, and wherein the first hash value is generated by a third computer system of the computer network associated with the customer and is transmitted to the second computer system in response to a registration request by the second computer system, and wherein the second computer system is registered in response to the registration request, and wherein the first hash value is generated by the third computer system in view of a first state of the third computer system;
receive, by the processing device, from a fourth computer system of the computer network associated with the customer, a second hash value during a second transaction not directly related to billing of the customer, wherein the second hash value is generated by the third computer system and is transmitted to the fourth computer system in response to a registration request by the fourth computer system, and wherein the second hash value is generated in view of a second state of the third computer system and the first hash value, and wherein the third computer system transitions from the first state to the second state in view of the registration of the second computer system;
receive, by the processing device, a report corresponding to a time period, wherein the report comprises the first hash value and usage information associated with usage of one or more services by the second computer system during the time period; and
verify, by the processing device, the usage information in view of the first hash value without communicating with the third computer system.

7. The non-transitory computer-readable storage medium of claim 6, wherein the processing device is further to:
verify, by the processing device, a state history of the third computer system in view of the first hash value; and
compare, by the processing device, the usage information with the state history.

8. The non-transitory computer-readable storage medium of claim 6, wherein the processing device is further to:
receive, by the processing device, from the second computer system, an authentication request.

9. The non-transitory computer-readable storage medium of claim 6, wherein the third computer system stores a randomly generated seed for computing the first hash value.

10. The non-transitory computer-readable storage medium of claim 6, wherein the processing device is further to:
bill, by the processing device, the customer in view of the usage information.

11. A first computer system comprising:
a network interface device; and
a processing device, operatively coupled to the network interface device to:
receive, via the network interface device, from a second computer system of a computer network associated with a customer, a first hash value during a first transaction not directly related to billing of the customer, wherein the first computer system is external to the computer network associated with the customer, and wherein the first hash value is generated by a third computer system of the computer network associated with the customer and is transmitted to the second computer system in response to a registration request by the second computer system, and wherein the second computer system is registered in response to the registration request, and wherein the first hashvalue is generated by the third computer system in view of a first state of the third computer system;

receive, via the network interface device, from a fourth computer system of the computer network associated with the customer, a second hash value during a second transaction not directly related to billing of the customer, wherein the second hash value is generated by the third computer system and is transmitted to the fourth computer system in response to a registration request by the fourth computer system, and wherein the second hash value is generated in view of a second state of the third computer system and the first hash value, and wherein the third computer system transitions from the first state to the second state in view of the registration of the second computer system;

receive, via the network interface device, a report corresponding to a time period, wherein the report comprises the first hash value and usage information associated with usage of one or more services by the second computer system during the time period; and verify the usage information in view of the first hash value without communicating with the third computer system.

12. The first computer system of claim 11, wherein the processing device is further to:

verify, by the processing device, a state history of the third computer system in view of the first hash value; and compare, by the processing device, the usage information with the state history.

13. The first computer system of claim 11, wherein the processing device is further to:

receive, by the processing device, from the second computer system, an authentication request.

14. The first computer system of claim 11, wherein the third computer system stores a randomly generated seed for computing the first hash value.

15. The first computer system of claim 1, wherein the processing device is further to:

bill, by the processing device, the customer in view of the usage information.

* * * * *